United States Patent
Hoffman et al.

(12) 
(10) Patent No.: US 6,325,550 B1
(45) Date of Patent: *Dec. 4, 2001

(54) THERMALLY PROTECTIVE COUPLING FOR A LIGHT CONDUIT LIGHTING SYSTEM

(75) Inventors: Joseph A. Hoffman, Minneapolis; Duwayne C. Radke, Woodbury; Stephen J. Pojar, Marine on St. Croix, all of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/060,558

(22) Filed: Apr. 15, 1998

(51) Int. Cl.7 ........................................ G02B 6/42
(52) U.S. Cl. ...................... 385/88; 385/901; 362/581
(58) Field of Search ........................... 385/133, 147, 385/901, 31, 146, 88–94; 313/418

(56) References Cited

U.S. PATENT DOCUMENTS

| | | | |
|---|---|---|---|
| 3,564,231 | * 2/1971 | Bruce et al. | 385/88 X |
| 3,624,385 | * 11/1971 | Wall | 385/88 X |
| 4,260,220 | 4/1981 | Whitehead | 385/133 |
| 4,805,984 | 2/1989 | Cobb, Jr. | 385/133 |
| 5,099,399 | * 3/1992 | Miller et al. | 385/133 |
| 5,309,541 | * 5/1994 | Flint | 385/133 |
| 5,363,470 | 11/1994 | Wortman | 385/147 |
| 5,475,785 | 12/1995 | Johanson | 385/100 |
| 5,483,119 | 1/1996 | Johanson | 313/498 |
| 5,661,839 | 8/1997 | Whitehead | 385/131 |
| 5,727,108 | * 3/1998 | Hed | 385/133 |
| 5,784,517 | 7/1998 | Johanson | 385/146 |

FOREIGN PATENT DOCUMENTS

| | | |
|---|---|---|
| 42 03 107 A | 8/1993 | (DE) . |
| 196 40 325 A1 | 3/1998 | (DE) . |
| 0 235 447 A | 9/1987 | (EP) . |
| 0 401 711 A | 12/1990 | (EP) . |
| 0 446 692 A | 9/1991 | (EP) . |
| WO 97 24553 A | 7/1997 | (WO) . |

OTHER PUBLICATIONS

Pohl, European Patent Appl. No. 0 400 711 A2, English Translated Version, Dec. 1990.*

Webster's II, New Riverside University Dictionary, p. 248, May 1997.*

* cited by examiner

Primary Examiner—John D. Lee
(74) Attorney, Agent, or Firm—David B. Patchett

(57) ABSTRACT

A light directing, load bearing, thermally protective coupling for connecting a light conduit, such as a light pipe, to a light source includes a body member having a first end connected with the light source and a second end connected with the light pipe. The body member contains a longitudinal channel which extends from the first end to the second end and includes an inner surface defining the channel which directs light from the light source, through the coupling, to the light pipe. To reduce light loss, the inner surface is provided with a highly reflective finish. The coupling is formed of a thermally conductive metal which dissipates heat from the light source and has a length sufficient to produce a temperature drop which allows the light pipe to be connected with the coupling without damaging the light pipe. The first end of the coupling includes a lip portion which is connected with a gasket provided on a light source reflector cone, and the second end of the coupling can include a collar which interlocks with a mating collar provided on an adjacent light pipe.

1 Claim, 5 Drawing Sheets

THERMALLY PROTECTIVE COUPLING FOR A LIGHT CONDUIT LIGHTING SYSTEM

FIELD OF THE INVENTION

The present invention relates to lighting systems and, more particularly, to a thermally protective coupling for connecting a light conduit, such as a light pipe, to a light source.

BACKGROUND OF THE INVENTION

The illumination of a large area by a central lighting system has long been desired because of its many advantages. For example, a centralized light source is easier to maintain than many distributed light sources. Heat generated by a centralized light source can be easily vented from the lighted areas, whereas heat from distributed light sources is not easily vented. A light distribution system connected to a centralized light source radiates minimal or no heat.

Light pipes or light conduits made of a transparent material having substantially planar inner surfaces and outer surfaces which are "in octature" have been utilized to transport light, as illustrated in U.S. Pat. No. 4,260,220 to Whitehead. These devices are typically constructed of an optical lighting film made of flexible polymeric sheets of a transparent material having a structured surface on one side and a smooth surface opposite the structured surface. The structured surface of the devices preferably includes a linear array of miniature substantially right angle isosceles prisms arranged side-by-side to form a plurality of peaks and grooves. Further, the perpendicular sides of the prisms make an angle of approximately 45 degrees with the smoother surface. This structure of the polymeric sheets, as well as the shape of the light conduit, enables light to be constrained to travel through the light conduit without escaping through its walls if the angle by which the light rays deviate from the longitudinal axis of the light conduit does not exceed a critical angle. Thus, light entering a light conduit at an angle less than the critical angle is totally internally reflected.

The critical angle is defined as the arc sine of the ratio of the index of refraction of the surrounding medium (typically air) to that of the wall material. For example, for a transparent material of polymethylmethacrylate having a refractive index of 1.493, all incident light rays less than the critical angle of about 27.3 degree, as measured along the longitudinal axis of the light conduit, will be totally internally reflected. On the other hand, incident light that enters the light conduit outside the critical angle will not be totally internally reflected.

Alternatively, a light conduit can be constructed using a multi-layer optical film, such as disclosed in U.S. Pat. No. 5,661,839 (Whitehead). Light conduits have been constructed with various cross-sections, such as square cross-sections as illustrated in U.S. Pat. No. 4,260,220, and circular cross-sections, as illustrated in U.S. Pat. No. 4,805,984.

In many applications, it is desirable to allow the light to escape from the light conduit in a controlled manner. Many means for facilitating emission of light from the light conduit have been used in the past, such as disclosed in U.S. Pat. No. 5,363,470 (Wortman). In another example, an extractor such as a diffuse scatterer made of a highly reflective white polymeric tape such as SCOTCHCAL ELECTROCUT brand film, manufactured by Minnesota Mining and Manufacturing Company, St. Paul, Minnesota, can be placed inside a light conduit to increase the rate of leakage, or emission, of the light from inside the light conduit. The diffuse scatterer increases the rate of leakage by "scattering" light that hits it into non-total internal reflecting angular regions of the light conduit, thereby increasing the amount of light in those angles which allow light to be emitted from the light conduit. Typically a strip of the highly reflective while polymeric tape is placed over the length of the light conduit to cause the scattering.

Current light distribution systems utilize segmented light conduits attached to a light source. The segments of light conduit can be joined to each other or to the light source by a variety of techniques. The U.S. Pat. No. 5,475,785 to Johanson, for example, discloses overlapping adjacent ends of the light source and the light conduit to form the connection. The heat generated by a light source during operation, however, can damage the materials typically used to construct light conduits. It would therefore be desirable to provide a connection between the light conduit and light source which protects the light conduit from the intense heat of the light source without interfering with the operation of the light distribution system.

SUMMARY OF THE INVENTION

The present invention provides a light directing thermally protective coupling for connecting a light conduit, such as a light pipe, to a light source. The coupling includes a body member having a first end connected with the light source and a second end connected with the light pipe. The body member contains a longitudinal channel which extends from the first end to the second end and includes an inner surface defining the channel which directs light from the light source, through the coupling, to the light pipe. To reduce light loss, the inner surface is provided with a highly reflective finish. In one embodiment, the body member is formed of a thermally conductive metal which conducts heat away from the light source and dissipates the heat. The body member has a length sufficient to produce a temperature drop between the light source and the remote end of the coupling so that the light pipe can be connected with the coupling without having the high temperature of the light source damage the light pipe. The coupling also provides an increased surface area which increases convective heat transfer, and further provides protection against radiative heat transfer.

In one embodiment, the coupling contains a plurality of radial holes which enhance convective heat transfer, and a reflective insert is arranged within the coupling to direct light through the coupling and to provide protection against radiative heat transfer. The first end of the coupling includes a lip portion which is connected with a gasket provided on the light source reflector cone, and the second end of the coupling can include a collar which interlocks with a mating collar provided on the adjacent end of an associated light pipe.

In addition to providing thermal protection and efficiently directing light, the coupling of the present invention is easy to install and can transmit axial forces, such as those created by thermal expansion and contraction, between the light source and the light pipe assembly.

BRIEF DESCRIPTION OF THE DRAWINGS

The present invention will be further described with reference to the accompanying drawings, wherein like reference numerals refer to like parts in the several views, in which.

DETAILED DESCRIPTION

Figure 1:
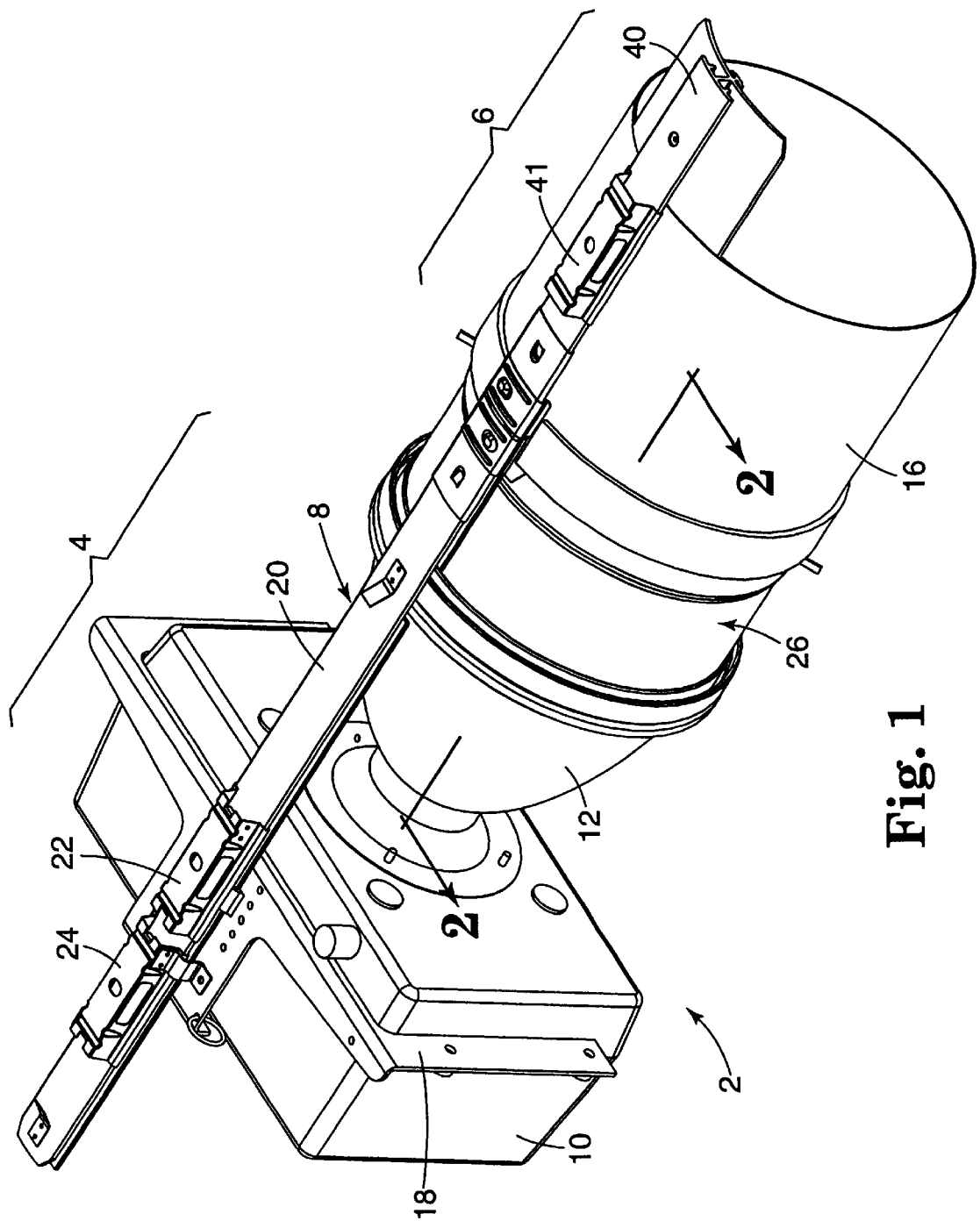
FIG. 1 is a perspective view of a lighting system including a thermally protective coupling according to the present invention.
Figure 2:
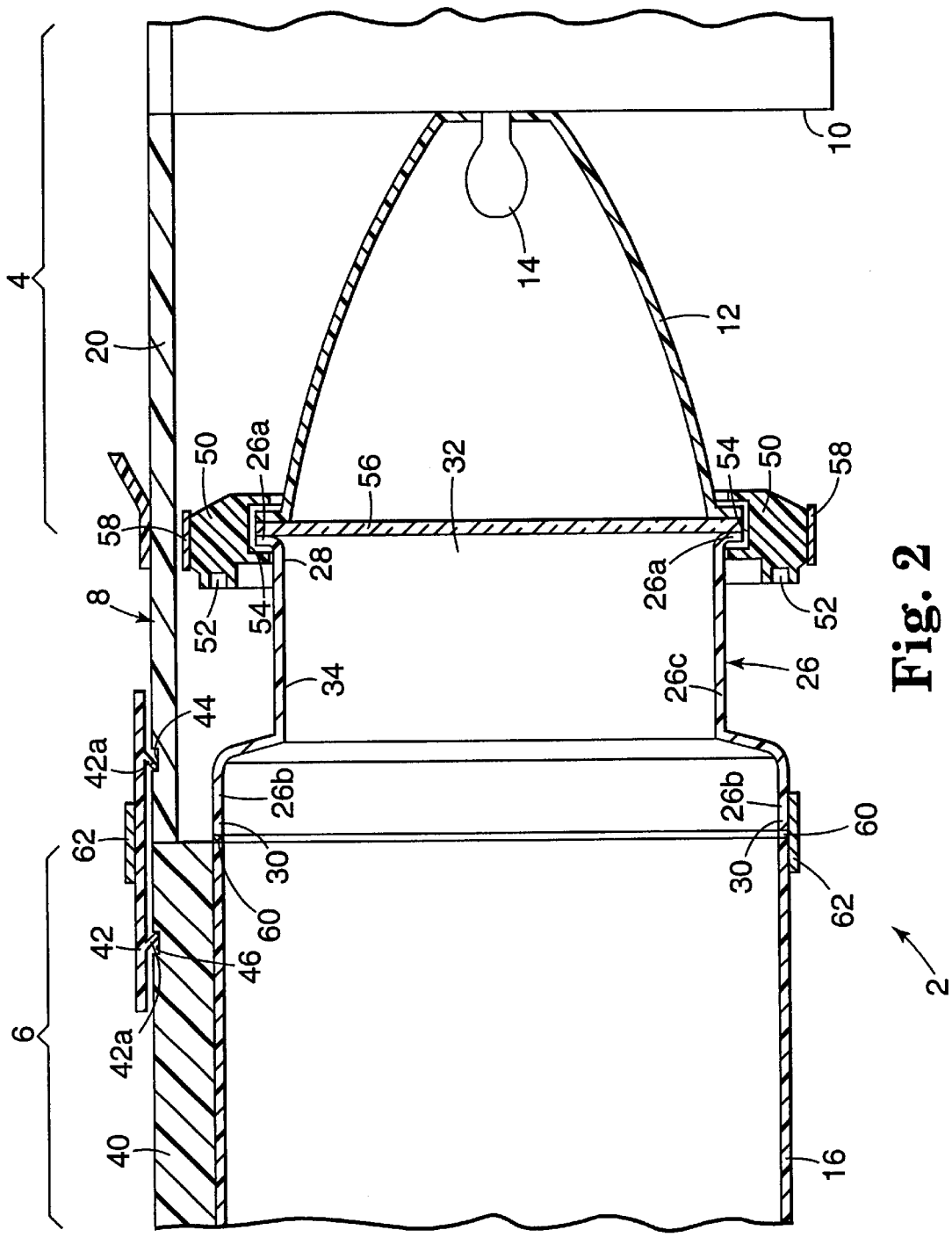
FIG. 2 is a cross-sectional view taken along line 2—2 of FIG. 1.
Figure 3:
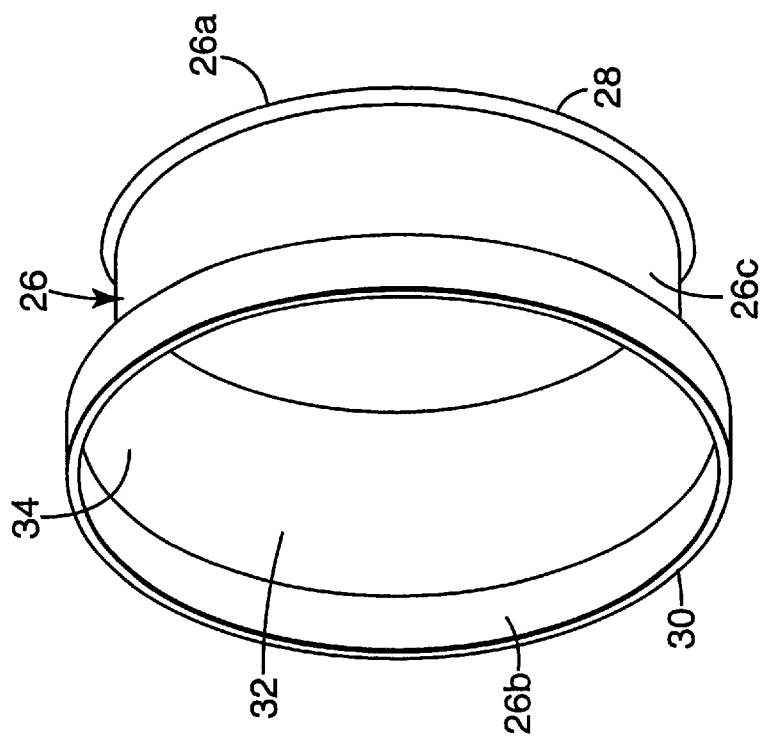
FIG. 3 is a perspective view of a thermally protective coupling.

Referring now to FIG. 1–3, there is shown a lighting system 2 including a light source 4, a coupling 26 connected with the light source, a light pipe assembly 6 connected with the coupling 26, and a mounting assembly 8 for hanging the lighting system 2 from a support surface (not shown), such as a ceiling. Additional details of the mounting assembly are described in co-pending U.S. patent application Ser. No. 09/249,364, now U.S. Pat. No. 6,152,578, which is assigned to the same assignee as the present invention and which is hereby incorporated by reference The light source is intended to represent a high intensity light source such as the LIGHTDRIVE 1000™ available from Fusion Lighting, Inc., Rockville, Md. The light source includes a housing 10, and a reflector cone 12 containing a light bulb 14. The light pipe assembly, such as the 3M LPS1010 light pipe system available from Minnesota Mining and Manufacturing Company, St. Paul, Minn., includes a plurality of interconnected light pipes 16. For simplicity, only one such light pipe is shown.

The mounting assembly includes a main housing bracket 18 connected with the light source housing 10, an elongated light source support rail 20 fixedly connected with the housing bracket 18, and a pair of hanger brackets 22, 24 mounted on the support rail 20. The hanger brackets 22, 24 are fixedly connected with the support surface. Each light pipe 16 includes a support rail 40 which extends along the length of the light pipe. A light pipe hanger bracket 41, similar to the light source hanger brackets 22, 24, is mounted to the support surface and slidably engages the light pipe support rail 40, thereby allowing the light pipe 16 and light pipe support rail 40 to move relative to the support surface in response to changes in the overall length of the light pipe assembly 6 caused by, for example, thermal expansion and contraction. Additional hanger brackets can be provided on light pipe support rail 40 for increased support. A connector or guide clip 42 connects the light source support rail 20 with the light pipe support rail 40. The guide clip 42 includes a pair of projections 42a which engage notches 44, 46 contained in the light source support rail 20 and light pipe support rail 40, respectively, which prevent the support rails from becoming separated. Thus, during contraction of the light pipe assembly, a tensile force is transmitted through the guide clip, and during expansion, a compressive force is transmitted through the guide clip. Alternatively, during expansion, the ends of the light source support rail 20 and the light pipe support rail can abut so that the compressive force will be transmitted directly through the support rails 20, 40 without going through the guide clip 42.

The coupling 26, which is shown separate from the lighting system in FIG. 3, provides a thermally protective interface between the light pipe 16 and the reflector cone 12. A typical light pipe includes a shell and an optical lighting film formed of various materials, such as polycarbonate and/or acrylic. These materials can be charred, melted, or otherwise damaged by high temperatures. Accordingly, a thermally protective interface is necessary to protect the light pipe from the high temperatures generated by high intensity light sources, such as sulfur plasma lights, which would otherwise damage the light pipe if the light pipe were connected directly to the reflector cone 12. The coupling 26 can be formed of a thermally conductive metal, such as aluminum, so that heat is conducted away from light source 4 and effectively dissipated. In addition, the high thermal conductivity provides a temperature drop over the length of the coupling which is large enough to allow the light pipe 16 to be connected with the coupling 26 without damaging the light pipe. The length of the coupling can be adjusted to achieve the desired temperature drop, and therefore allow light pipes formed of various materials to be connected with the coupling without damaging the light pipe.

The coupling 26 has a hollow cylindrical shape and includes a first end 28 which is connected with the light source 4 and a second end 30 which is connected with the light pipe 16. More specifically, the coupling includes a lip portion 26a which is connected with the reflector cone 12, a flared end portion 26b which is connected with the light pipe 16, and a narrow intermediate portion 26c having a smaller diameter than the flared end portion 26b extending between the lip portion 26a and the flared end portion 26b. The flared configuration of the coupling is provided to properly align the reflector cone 12 with the light pipe 16. The coupling can also have a tapered configuration. In addition, the flared end portion 26b and the intermediate portion 26c can have the same diameter depending on the diameter of the reflector cone and the diameter of the light pipe and further depending on how the coupling is connected with the reflector cone and light pipe. The coupling 26 contains a longitudinal internal channel 32 which extends through the coupling, and includes an inner surface 34 which directs light from the light source 4 to the light pipe 16. The inner surface 34 can be, for example, a highly reflective polished metal surface which directs the light through the coupling. In addition, the polished metal surface can include a reflective coating to further increase reflection. To minimize light loss and thereby optimize performance, the inner surface is made as highly reflective as possible. A typical highly reflective surface can be as much as 96% reflective or greater. While a coupling having a low reflectivity will perform adequately, the highest possible reflectivity is desired. The highly polished inner surface 34 surface also provides thermal protection by dispersing the radiant heat transfer from the light source 4. However, the coupling will provide thermal protection even if the inner surface is not highly reflective. The coupling 26 also provides an increased surface area for convective heat transfer. Thus, the thermal coupling provides thermal protection by conducting heat from the light source 4, by providing a radiation dispersing barrier which provides thermal protection against radiative heat transfer, and by increasing the convective heat transfer. The coupling is therefore cooled enough to allow the light pipe 16 to be connected with the reflector cone 12 without damaging the light pipe. While the coupling and its inner surface are shown as having circular cross-sections, other geometric configurations, such as square or triangular, can be used without significantly affecting the operation of the coupling.

Figure 4:
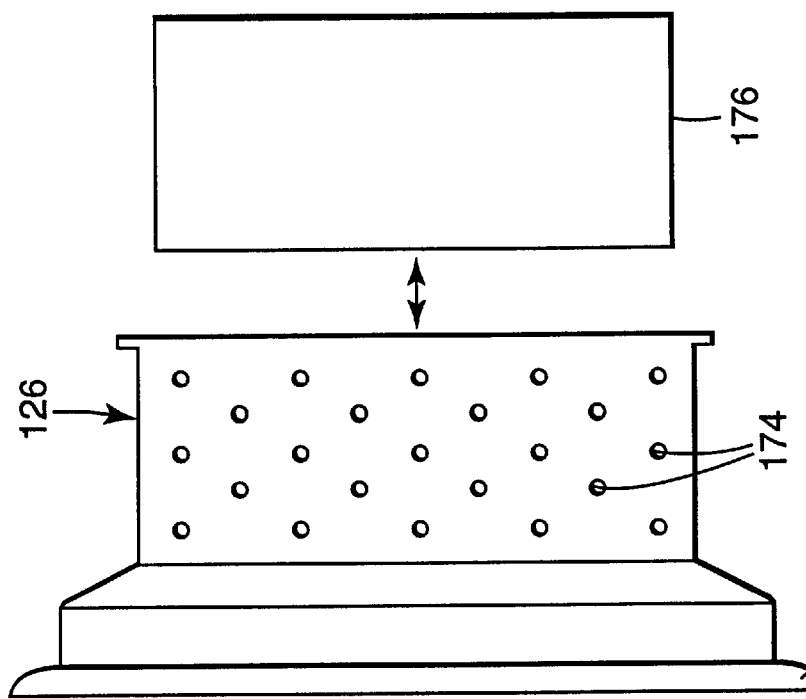
FIG. 4 is a side view of an alternate embodiment of the invention.

FIG. 4 shows a thermally protective coupling 126 including a collar 172 which is adapted to connect with a mating collar provided on an adjacent end of the light pipe as described below. The coupling 126 contains a plurality of radially arranged openings 174 which provide the coupling with enhanced heat dissipation properties. To prevent light from escaping from the coupling 126, a light directing insert 176 is arranged concentrically within the coupling 126. The insert can be formed of polished aluminum having a highly reflective mirror like interior finish. Alternatively, since the insert 176 provides a certain degree of thermal protection to the coupling, the coupling 126 can be formed of other materials, such as polycarbonate.

In addition to providing thermal protection for the light pipe 16, the coupling 26 is easy to install and forms a strong connection with the reflector cone 12. A coupling gasket 50 connects the coupling 26 with the reflector cone 12. The coupling gasket 50 includes an annular transversely extending groove 52 which receives the end of the light pipe 16 if the coupling 26 is not used and the light pipe 16 is connected directly with the reflector cone 12. As noted previously, however, the light pipe can be damaged by the heat generated from the light if the light pipe is connected directly to the reflector cone 12. In addition, such a connection requires an installer to apply caulk to the joint between the coupling gasket 50 and the light pipe 16 to secure the connection. The coupling gasket 50 also includes an inwardly directed annular groove 54 which receives the edge of the reflector cone 12, the edge of a transparent cover 56 for the reflector cone 12, and a lip portion 26a of the coupling 26. A V-band clamp 58 arranged around coupling gasket 50 is used to tighten the coupling gasket connection. Other known connecting techniques, such as clamps, bolted flanges, or buckles, can also be used to connect the coupling 26 with the reflector cone 12.

An annular gasket 60 is provided between the light pipe 16 and the coupling 26 to produce a tight seal therebetween. In addition, a strap 62 extends around the joint formed by the light pipe 16, the annular gasket 60, and the coupling 26 to provide added support for the connection and to provide a more effective seal. The strap 62 is secured to the outer surface of the guide clip 42. The strap can also be fastened to the support rails 20, 40, the light pipe 16, or the coupling 26.

Figure 5:
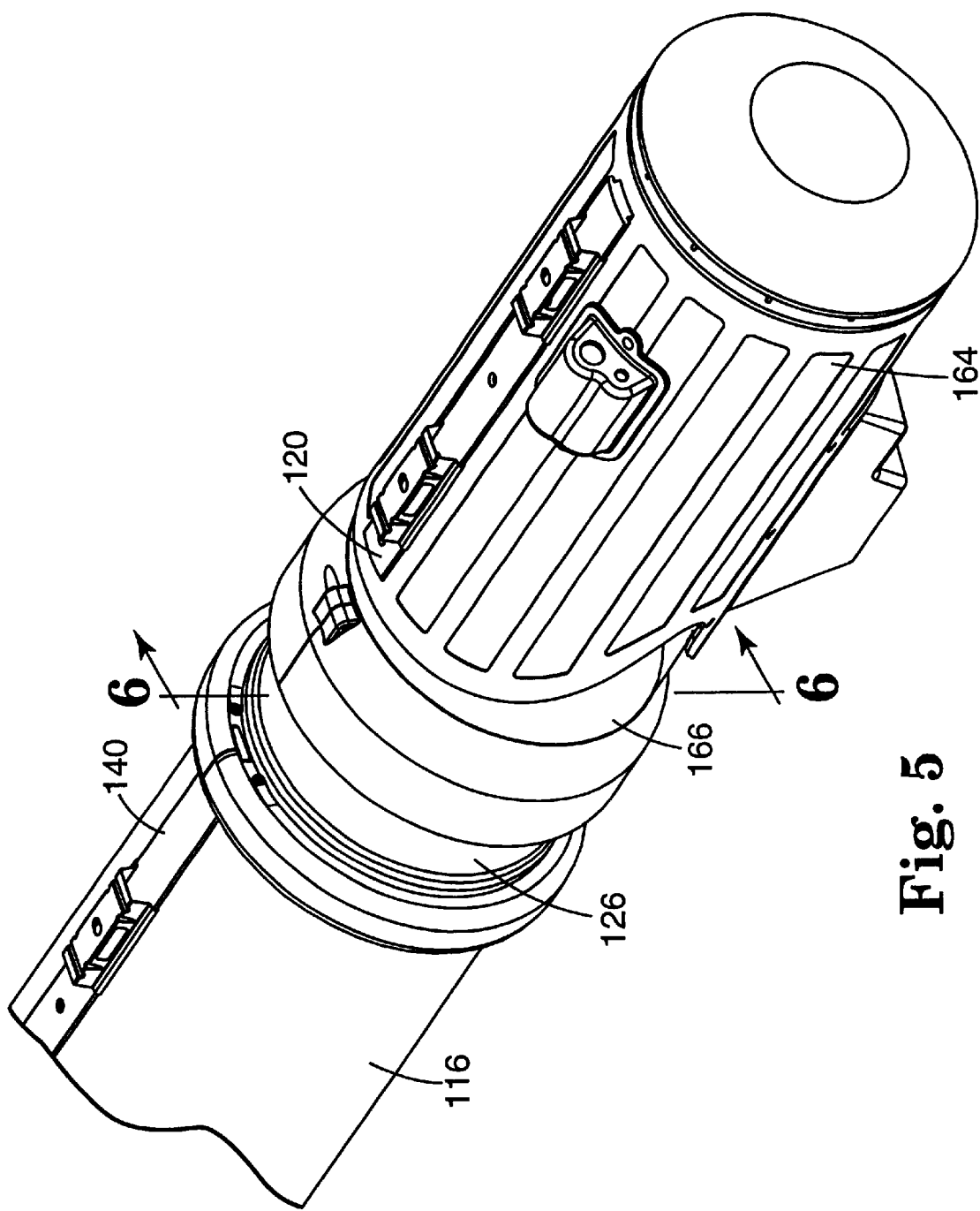
FIG. 5 is a perspective view of an alternate lighting system including a thermally protective coupling according to the present invention; arid
Figure 6:
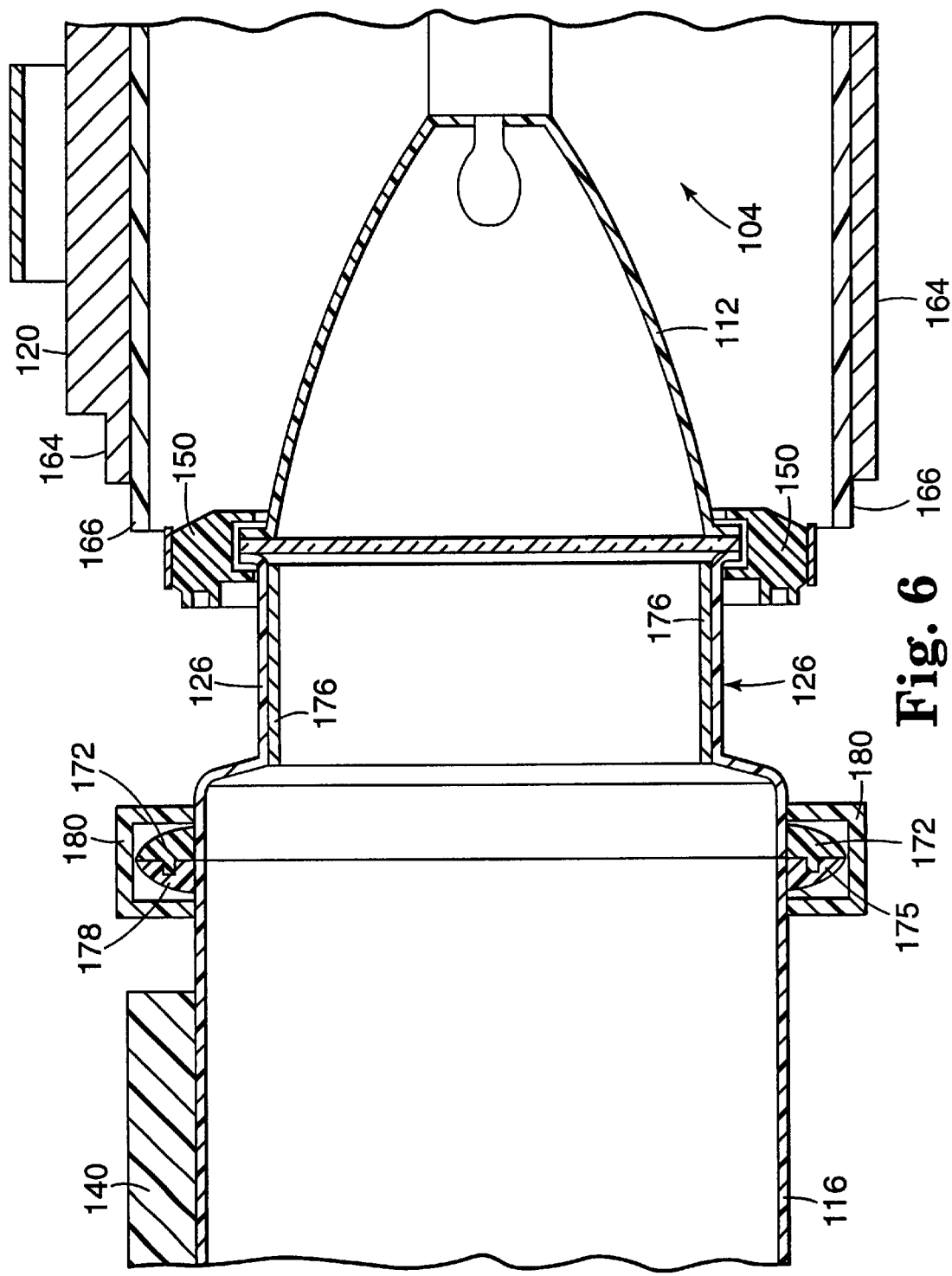
FIG. 6 is a cross-sectional view taken along line 6—6 of FIG. 5.

FIGS. 5 and 6 show the coupling 126 and insert 176 installed in a light system including an alternate mounting assembly. Additional details of this mounting system are also described in pending U.S. patent application Ser. No. 09/249,364, now U.S. Pat. No. 6,152,578, which is assigned to the same assignee as the present invention and which is hereby incorporated by reference. The mounting assembly includes a shell or casing 164 which receives the chassis 166 of the light source 104. The chassis 166 contains the reflector cone 112 and the light source housing (not shown). An elongated support rail 120 is formed integrally with and extends along the top surface of the casing 164.

In contrast to the mounting assembly of FIGS. 1 and 2, the light source support rail 120 of FIGS. 5 and 6 is not connected with the light pipe support rail 140. Rather, the entire length of the light source support rail 120 is contained within the length of the casing 164. Without connecting the support rails 120 and 140, however, tensile and compression forces are transmitted from the light pipe 116 to the reflector cone 112 through the coupling 126. Since the connection between the light pipe 16 and coupling 26 described in reference to FIGS. 1 and 2 is not suited to transmit tensile forces, FIGS. 5 and 6 show an alternate connection between the coupling 126 and light pipe 116 which serves to transmit both tensile and compressive forces. The connection includes mating interlocking collars 172, 178 on adjacent ends of the light pipe 116 and the coupling 126. A suitable connection is described more fully in pending U.S. patent application Ser. No. 09/060,727, now U.S. Pat. No. 6,130,976, which is assigned to the same assignee as the present invention and which is hereby incorporated by reference. A clamp 180 encloses the collars. Alternatively, the light pipe 116 can be connected directly to the coupling gasket 150, whereby the coupling 126 is eliminated.

While several embodiments of the present invention have now been described, it will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A light directing, load bearing, thermally protective coupling assembly for connecting a hollow light pipe to a light source, comprising:

(a) a coupling formed of a thermally conductive metal and containing a plurality of heat dissipating holes, said coupling having a first end with a lip portion adapted for engagement with a gasket provided on the light source and a second end including a collar adapted for mating engagement with a collar connected with the light pipe, said coupling containing a longitudinal channel extending from said first to said second end, said coupling including an intermediate portion extending from said first end having a first diameter and a flared portion extending from said intermediate portion having a second diameter greater than said first diameter; and (b) a polished reflective sleeve arranged within said coupling channel to direct light from the light source to the light pipe.

* * * * *

UNITED STATES PATENT AND TRADEMARK OFFICE
CERTIFICATE OF CORRECTION

PATENT NO. : 6,325,550 B1
DATED : December 4, 2001
INVENTOR(S) : Hoffman, Joseph A.

It is certified that error appears in the above-identified patent and that said Letters Patent is hereby corrected as shown below:

Title page,
OTHER PUBLICATIONS, delete "Pohl, European Patent Appl. No. 0 400 711 A2, English Translated Version, Dec. 1990.*" and insert in place thereof -- Pöltl, European Patent Appl. No. 0 400 711 A2, English Translated Version, Dec. 1990.* --.

Column 3,
Line 9, delete "arid" and insert in place thereof -- and --.

Signed and Sealed this

Twenty-third Day of April, 2002

*Attest:*

JAMES E. ROGAN
*Attesting Officer*     *Director of the United States Patent and Trademark Office*